United States Patent [19]

Hayashi et al.

[11] Patent Number: 5,049,591
[45] Date of Patent: Sep. 17, 1991

[54] SHAPE MEMORY POLYMER FOAM

[75] Inventors: Shunichi Hayashi; Hiroshi Fujimura, both of Nagoya, Japan

[73] Assignee: Mitsubishi Jukogyo Kabushiki Kaisha, Tokyo, Japan

[21] Appl. No.: 413,770

[22] Filed: Sep. 28, 1989

[30] Foreign Application Priority Data

Sep. 30, 1988 [JP] Japan ................................ 63-244340

[51] Int. Cl.$^5$ ............................................ C08G 18/48
[52] U.S. Cl. ...................................... 521/159; 521/164; 521/167; 528/59; 264/345; 264/346; 264/348
[58] Field of Search ............... 521/159, 164, 167, 170, 521/174, 155, 50; 528/59; 264/345, 346, 348

[56] References Cited

U.S. PATENT DOCUMENTS 4,689,356 8/1987 Peffley et al. ........................ 521/159
4,722,946 2/1988 Hostettler ............................ 521/159
4,909,976 3/1990 Cucolo et al. ...................... 264/345

OTHER PUBLICATIONS

"Development of Polymeric Elasticity Memory Material", Mitsubishi Juko, GIHO, vol. 25, No. 3, (1988), (pp. 236–240), (no English language translation).

Primary Examiner—John Kight, III
Assistant Examiner—Dvc Truong
Attorney, Agent, or Firm—McAulay Fisher Nissen Goldberg & Kiel

[57] ABSTRACT

A shape memory polymer foam which takes on a deformed shape and an as-molded shaped, said deformed shape being produced when the polymer foam is compressed at a temperature higher than the glass transition point (Tg) of the polymer and then kept compressed at a temperature lower than the Tg until compression sets, said as-molded shape being produced when the compressed polymer foam is heated again to a temperature higher than the Tg until it recovers its original shape.

2 Claims, No Drawings

SHAPE MEMORY POLYMER FOAM

FIELD OF THE INVENTION AND RELATED ART STATEMENT

The present invention relates to a shape memory polymer foam.

Polymer foams with cellular structure are generally known. Polyurethane foams are representative of them. They have characteristic properties such as resilience and heat insulation, and there are a variety of commercial products which utilize these properties. These foams used to be molded in a desired shape and used as molded-state, except in the case of form-in-place molding.

In the field of solid polymer moldings, there have been proposed shape memory polymer moldings which take on the as-molded shape and the deformed shape as the temperature changes.

Shape memory polymer moldings remain deformed if they are deformed at a temperature higher than the glass transition point (Tg for short) of the polymer and lower than the molding temperature and then cooled below Tg in the deformed state. Shape memory polymer moldings in the deformed state recover their original molded shape when heated to a temperature higher than Tg and lower than the molding temperature. In other words, shape memory polymer moldings take on the as-molded shape and the deformed shape as the temperature changes.

Meanwhile, polymer foams are extremely bulky for their weight because they are made with a large number of cells. This bulkiness is a hindrance to their transportation from a molding plant to a spot of use. They would be convenient for transportation if they have a small volume at the time of transportation and recover their prescribed size at the time of use.

However, there has never been proposed a shape memory polymer foam which takes on a deformed shape and an as-molded shape according to its use.

OBJECT AND SUMMARY OF THE INVENTION

It is an object of the present invention to provide a polymer foam which has the shape memory property and hence takes on a deformed shape and an as-molded shape according to its use.

The gist of the present invention resides in a shape memory polymer foam which takes on a deformed shape and an as-molded shape, said deformed shape being produced when the polymer foam is compressed at a temperature higher than the glass transition point of the polymer and then kept compressed at a temperature lower than the glass transition point until compression sets, said as-molded shape being produced when the compressed polymer foam is heated again to a temperature higher than the glass transition point until it recovers its original shape.

The shape memory polymer foam of the present invention can be easily deformed as required and restored to its original shape (as-molded shape) by a simple heating operation.

DETAILED DESCRIPTION OF PREFERRED EMBODIMENTS

The shape memory polymer foam of the present invention takes on two shapes, the first one being that of the conventional molded foam and the second one being that of the foam which has undergone deformation and setting under compression. If the shape memory polymer foam is of open-cell structure, it can be greatly deformed by squeezing cells with a comparatively small force. If the shape memory polymer foam is of closed-cell structure, it recovers its original shape rapidly on account of the expansion of the gas which has been compressed in cells at the time of deformation.

The shape memory polymer foam may be given desired physical properties such as modulus which vary with its two shapes. Therefore, it will find many uses according to its shapes and physical properties. For example, a shape memory polymer foam made from a polymer whose Tg is close to room temperature would be easily deformed, followed by setting, to a user's desired shape at any time by using a familiar heating means such as a hair dryer.

The shape memory polymer foam of the present invention can be made from urethane polymers, styrene-butadiene polymers, crystalline diene polymers, norbornane polymers, and the like.

Preferable among the shape memory polymer foams is a polyurethane foam produced by the prepolymer process from a compound composed of a difunctional diisocyanate, a difunctional polyol, and a difunctional chain extender containing active hydrogen, whose molar ratio is 2.00–1.10:1.00:1.00–0.10, preferably 1.80–1.20:1.00:0.80–0.20, and a blowing agent, said polyurethane containing approximately equal amounts of isocyanate groups [NCO] and hydroxyl groups [OH] at the terminals of the polymer chains, and having a Tg in the range of $-50°$ to $60°$ C. and a crystallinity of 3–50 wt %.

The polyurethane foam is made up of polymer chains having substantially no excess isocyanate groups at their terminals and hence contains no allophanate links which form rigid crosslinks. This means that the polyurethane foam is a thermoplastic chain polymer which can be processed upon heating. In addition, this chain polymer will exhibit a desired modulus if it has an adequate crystallinity.

The crystallinity should preferably be in the range of 3 to 50 wt %. With a crystallinity lower than 3 wt %, the polymer will have a low rubber elasticity at a temperature higher than Tg. On the other hand, with a crystallinity higher than 50 wt %, the polymer will have a high rubber elasticity at a temperature higher than Tg, with the result that the ratio of moduli at temperatures $10°$ C. above and below Tg is smaller.

The polymer can be produced from the following raw materials, which are illustrative only and not limitative.

The first raw material is a difunctional isocyanate which is represented by the general formula OCN-R-NCO, where R is a group having no or one or two benzene rings. It includes, for example, 2,4-toluene diisocyanate, 4,4'-diphenylmethane diisocyanate, carbodiimide-modified 4,4'-diphenylmethane diisocyanate, and hexamethylene diisocyanate.

The second raw material is a difunctional polyol which is represented by the general formula OH-R'-OH, where R' is a group having no or one or two benzene rings. The second raw material may also be a reaction product of said difunctional polyol and a difunctional carboxylic acid or cyclic ether. It includes, for example, polypropylene glycol, 1,4-butane glycol adipate, polytetramethylene glycol, polyethylene glycol, and an adduct of bisphenol-A with propylene oxide.

The third raw material is a difunctional chain extender containing active hydrogen which is represented by the general formula OH—R"—OH, where R" is a $(CH_2)_n$ group or a groups having one or two benzene rings. It includes, for example, ethylene glycol, 1,4-butane glycol, bis(2-hydroxyethyl)hydroquinone, an adduct of bisphenol-A with ethylene oxide, and an adduct of bisphenol-A with propylene oxide.

The above-mentioned three raw materials (isocyanate, polyol, and chain extender) (together with a catalyst, if necessary) are made into an urethane elastomer by the prepolymer process in the following manner.

First, the diisocyanate and polyol are reacted in a specific molar ratio of [NCO]/[OH] to give a prepolymer. When the reaction is complete, the chain extender is added in an amount sufficient to establish a desired molar ratio of [chain extender]/[prepolymer]. The resulting mixture is poured into a mold and then kept at 80° C. for one or two days in a constant temperature dryer for crosslinking reactions. This process may or may not require any solvent.

The polyurethane elastomer produced as mentioned above will have a Tg and other physical properties as desired, if the following six factors are properly selected. (1) the kind of the isocyanate, (2) the kind of the polyol, (3) the kind of the chain extender, (4) the [NCO]/[OH] ratio, (5) the [chain extender]/[prepolymer] ratio, and (6) the curing condition.

The thus produced polyurethane elastomer may be represented by the following general formula.

HOR"OCONH(RNHCOOR'OCONH)$_n$RNH-
COOR"OCONH(RNHCOOROCONH)$_n$RNH-
COOR"OH where m is 1–16 and n is 0–16.

Foaming may be accomplished via prepolymer by the conventional process or frothing process.

In the case of foaming via prepolymer, the chain extender is added together with a blowing agent.

The blowing agent that can be used for foaming may be either of decomposition type (which evolves a gas upon chemical decomposition) or of evaporation type (which vaporizes without chemical reaction). The blowing agent of decomposition type includes, for example, sodium bicarbonate, ammonium carbonate, ammonium nitrite, azide compounds, light metals which evolve hydrogen upon reaction with water, azodicarbonamide, and N,N'-dinitrosopentamethylenetetramine. The blowing agent of evaporation type includes, for example, trichloromonofluoromethane, trichlorotrifluoroethane, methylene chloride, and compressed nitrogen gas.

EXAMPLES 1 to 40

First, a prepolymer was prepared by reacting, in the absence of catalyst, an isocyanate component and a polyol component in the ratio shown in Table 1. To the prepolymer was added a chain extender in the ratio shown in Table 1, together with a blowing agent (trichloromonofluoromethane having a boiling point of 23.8° C.) in an amount of 20 parts for 100 parts of polyurethane. The resulting mixture was heat-cured to give a shape memory polyurethane foam. The shape memory polyurethane foam, which expanded 20 times the original volume, had the Tg and crystallinity as shown in Table 1. The Tg was measured by the DSC method (differential scanning calorimetry). The crystallinity (wt %) was measured by the X-ray diffractometry.

Secondly, the thus obtained polyurethane foam was examined for shape memory performance. The polyurethane foam in Example 38 was made into a cylindrical heat insulating material measuring 9.5 cm in inside diameter and 4 cm in thickness. The heat insulating material was tightly slipped on a pipe 10 cm in outside diameter and then heated to about 50° C. and cooled to room temperature while keeping its outside diameter at 12 cm under external pressure to set the deformation. The pipe-insulation combination was inserted into a duct 15 cm in inside diameter. The deformed insulation was heated and restored to its original shape by heating with a hot gas at about 50° C. passing through the pipe. The heat insulating material came into close contact with the inside of the duct and firmly held the pipe in the duct owing to the resilience of the polyurethane foam.

TABLE 1

| | Molecular weight | 1 | 2 | 3 | 4 | 5 | 6 | 7 | 8 | 9 | 10 |
|---|---|---|---|---|---|---|---|---|---|---|---|
| Raw materials and molar ratio | | | | | | | | | | | |
| Diisocyanate | | | | | | | | | | | |
| 2,4-toluene diisocyanate | 174 | 1.5 | | | 1.5 | | | | | | |
| 4,4'-diphenylmethane diisocyanate | 250 | | | | | 1.5 | | | 1.5 | 1.5 | 1.5 |
| 4,4'-diphenylmethane diisocyanate (carbodiimide-modified) | 290 | | | | | | 1.5 | | | | |
| 4,4'-diphenylmethane diisocyanate (carbodiimide-modified) | 303 | | 1.5 | 1.5 | | | | | | | |
| hexamethylene diisocyanate | 168 | | | | | | | 1.5 | | | |
| Polyol | | | | | | | | | | | |
| polypropylene glycol | 400 | | | | | | | | | | |
| " | 700 | | | 1.0 | 1.0 | 1.0 | 1.0 | 1.0 | 1.0 | 1.0 | 1.0 |
| " | 1000 | 0.88 | | | | | | | | | |
| 1,4-butaneglycol adipate | 600 | | | | | | | | | | |
| " | 1000 | | | | | | | | | | |
| " | 2000 | | | | | | | | | | |
| polytetramethylene glycol | 650 | | | | | | | | | | |
| " | 850 | | | | | | | | | | |
| " | 1000 | | | | | | | | | | |
| polyethylene glycol | 600 | | | | | | | | | | |
| bisphenol-A + propylene oxide | 800 | 1.0 | | | | | | | | | |
| Chain extender | | | | | | | | | | | |
| ethylene glycol | 62 | | | | | | | | | 0.51 | |

TABLE 1-continued

| | Molecular weight | | | | | | | | | |
|---|---|---|---|---|---|---|---|---|---|---|
| 1,4-butane glycol | 90 | 0.51 | | | | | | | 0.51 | |
| bis(2-hydroxyethyl) hydroquinone | 198 | | | | | | | | | |
| bisphenol-A + propylene oxide | 327 | | | | | | | | | |
| " | 360 | | 0.51 | 0.51 | 0.51 | 0.51 | 0.51 | 0.51 | | |
| bisphenol-A + propylene oxide | 360 | | | | | | | | | 0.51 |
| Measured values of physical properties | | | | | | | | | | |
| Tg (°C.) | | 24 | −10 | 15 | −11 | 14 | 16 | −45 | 9 | 6 | 12 |
| Crystallinity (wt %) | | | 20 | 20 | 30 | | | 25 | | | |

| | Molecular weight | 11 | 12 | 13 | 14 | 15 | 16 | 17 | 18 | 19 | 20 |
|---|---|---|---|---|---|---|---|---|---|---|---|
| Raw materials and molar ratio | | | | | | | | | | | |
| Diisocyanate | | | | | | | | | | | |
| 2,4-toluene diisocyanate | 174 | | | | | | | | | | |
| 4,4'-diphenylmethane diisocyanate | 250 | 1.5 | 1.5 | 1.5 | 1.2 | 1.8 | 1.35 | 1.35 | 1.35 | 1.35 | 1.35 |
| 4,4'-diphenylmethane diisocyanate (carbodiimide-modified) | 290 | | | | | | | | | | |
| 4,4'-diphenylmethane diisocyanate (carbodiimide-modified) | 303 | | | | | | | | | | |
| hexamethylene diisocyanate | 168 | | | | | | | | | | |
| Polyol | | | | | | | | | | | |
| polypropylene glycol | 400 | | | | | | | | | | |
| " | 700 | 1.0 | 1.0 | | 1.0 | 1.0 | 1.0 | | | | |
| " | 1000 | | | | | | | 1.0 | | | |
| 1,4-butaneglycol adipate | 600 | | | | | | | | 1.0 | | |
| " | 1000 | | | | | | | | | 1.0 | |
| " | 2000 | | | | | | | | | | 1.0 |
| polyethylene glycol | 650 | | | | | | | | | | |
| " | 850 | | | | | | | | | | |
| " | 1000 | | | | | | | | | | |
| polyethylene glycol | 600 | | | 1.0 | | | | | | | |
| bisphenol-A + propylene oxide | 800 | | | | | | | | | | |
| Chain extender | | | | | | | | | | | |
| ethylene glycol | 62 | | | | | | | | | | |
| 1,4-butane glycol | 90 | | | | | | | | | | |
| bis(2-hydroxyethyl) hydroquinone | 198 | | 0.51 | | | | | | | | |
| bisphenol-A + ethylene oxide | 327 | 0.51 | | | 0.21 | 0.81 | 0.36 | 0.36 | 0.36 | 0.36 | 0.36 |
| " | 360 | | | | | | | | | | |
| bisphenol-A + propylene oxide | 360 | | | | | | | | | | |
| Measured values of physical properties | | | | | | | | | | | |
| Tg (°C.) | | 16 | −7 | −6 | −4 | 25 | 5 | −22 | 10 | −18 | −45 |
| Crystallinity (wt %) | | | 20 | 30 | | 20 | 25 | | | 25 | 25 |

| | Molecular weight | 21 | 22 | 23 | 24 | 25 | 26 | 27 | 28 | 29 | 30 |
|---|---|---|---|---|---|---|---|---|---|---|---|
| Raw materials and molar ratio | | | | | | | | | | | |
| Diisocyanate | | | | | | | | | | | |
| 2,4-toluene diisocyanate | 174 | | | | | | | 1.5 | 1.4 | 1.3 | 1.2 |
| 4,4'-diphenylmethane diisocyanate | 250 | 1.35 | 1.35 | 1.35 | 1.5 | 1.5 | 1.35 | | | | |
| 4,4'-diphenylmethane diisocyanate (carbodiimide-modified) | 290 | | | | | | | | | | |
| 4,4'-diphenylmethane diisocyanate (carbodiimide-modified) | 303 | | | | | | | | | | |
| hexamethylene diisocyanate | 168 | | | | | | | | | | |
| Polyol | | | | | | | | | | | |
| polypropylene glycol | 400 | | | | | | 1.0 | | | | |
| " | 700 | | | | 1.0 | 1.0 | | | | | |
| " | 1000 | | | | | | | | | | |
| 1,4-butaneglycol adipate | 600 | | | | | | | | | | |
| " | 1000 | | | | | | | | | | |
| " | 2000 | | | | | | | | | | |
| polytetramethylene glycol | 650 | 1.0 | | | | | | | | | |
| " | 850 | | 1.0 | | | | | | | | |
| " | 1000 | | | 1.0 | | | | | | | |
| polyethylene glycol | 600 | | | | | | | | | | |
| bisphenol-A + propylene oxide | 800 | | | | | | | 1.0 | 1.0 | 1.0 | 1.0 |
| Chain extender | | | | | | | | | | | |
| ethylene glycol | 62 | | | | | | | | | | |
| 1,4-butane glycol | 90 | | | | | | | | | | |
| bis(2-hydroxyethyl) | 198 | | | | | | | 0.51 | 0.41 | 0.31 | 0.21 |

TABLE 1-continued

| | | | | | | | | | | |
|---|---|---|---|---|---|---|---|---|---|---|
| hydroquinone | | | | | | | | | | |
| bisphenol-A + ethylene oxide | 327 | 0.36 | 0.36 | 0.36 | 0.43 | 0.35 | 0.36 | | | |
| " | 360 | | | | | | | | | |
| bisphenol-A + propylene oxide | 360 | | | | | | | | | |
| Measured values of physical properties | | | | | | | | | | |
| Tg (°C.) | | −18 | −30 | −38 | 5 | 8 | 23 | 26 | 21 | 19 | 19 |
| Crystallinity (wt %) | | 25 | 25 | | 25 | 15 | 15 | 10 | 15 | 15 | 15 |

| | Molecular weight | 31 | 32 | 33 | 34 | 35 | 36 | 37 | 38 | 39 | 40 |
|---|---|---|---|---|---|---|---|---|---|---|---|
| Raw materials and molar ratio | | | | | | | | | | | |
| Diisocyanate | | | | | | | | | | | |
| 2,4-toluene diisocyanate | 174 | | | 1.5 | | | | | | | |
| 4,4'-diphenylmethane diisocyanate | 250 | 1.59 | 1.68 | | 1.3 | 1.7 | 1.59 | 1.68 | 1.5 | 1.5 | 1.81 |
| 4,4'-diphenylmethane diisocyanate (carbodiimide-modified) | 290 | | | | | | | | | | |
| 4,4'-diphenylmethane diisocyanate (carbodiimide-modified) | 303 | | | | | | | | | | |
| hexamethylene diisocyanate | 168 | | | | | | | | | | |
| Polyol | | | | | | | | | | | |
| polypropylene glycol | 400 | | | | | | | | | | |
| " | 700 | 1.0 | 1.0 | | 1.0 | 1.0 | 1.0 | 1.0 | | | |
| " | 1000 | | | | | | | | | | |
| 1,4-butaneglycol adipate | 600 | | | | | | | | | | |
| " | 1000 | | | | | | | | | | |
| " | 2000 | | | | | | | | | | |
| polytetramethylene glycol | 650 | | | | | | | | | | |
| " | 850 | | | | | | | | | | |
| " | 1000 | | | | | | | | | | |
| polyethylene glycol | 600 | | | | | | | | | | |
| bisphenol-A + propylene oxide | 800 | | | 1.0 | | | | | 1.0 | 1.0 | 1.0 |
| Chain extender | | | | | | | | | | | |
| ethylene glycol | 62 | | | | 0.31 | 0.71 | 0.51 | 0.51 | | | |
| 1,4-butane glycol | 90 | | | | | | | | 0.51 | | |
| bis(2-hydroxyethyl) hydroquinone | 198 | | | 0.51 | | | | | | 0.51 | 0.81 |
| bisphenol-A + ethylene oxide | 327 | | | | | | | | | | |
| " | 360 | 0.51 | 0.51 | | | | | | | | |
| bisphenol-A + propylene oxide | 360 | | | | | | | | | | |
| Measured values of physical properties | | | | | | | | | | | |
| Tg (°C.) | | 10 | 11 | 22 | 2 | 15 | 11 | 12 | 35 | 40 | 48 |
| Crystallinity (wt %) | | 15 | 20 | 15 | 20 | 15 | 15 | 10 | 10 | 5 | 5 |

The present invention constructed as mentioned above produces the following effects. It provides a shape memory polymer foam which takes on not only the as-molded shape but also the deformed shape as desired, and which recovers its original shape by a simple heating operation. If the shape memory polymer foam is of open-cell type, it can be greatly deformed with a small force. The large amount of deformation and the change of physical properties that takes place as the result of deformation permit the polymer foam to find a variety of uses. If the shape memory foam is of closed-cell type, it recovers its original shape rapidly on account of the expansion of the gas which has been compressed in cells at the time of deformation. This property makes the polymer foam more versatile.

What is claimed is:

1. A shape memory polyurethane polymer foam which takes on a deformed shape and an as-molded shape, said deformed shape being produced when the polymer foam is compressed at a temperature higher than the glass transition point of the polymer and then kept compressed at a temperature lower than the glass transition point until compression sets, said as-molded shape being produced when the compressed polymer foam is heated again to a temperature higher than the glass transition point until it recovers its original shape.

2. A shape memory polymer foam as claimed in claim 1, which is a polyurethane foam produced by the prepolymer process from a compound composed of a difunctional diisocyanate, a difunctional polyol, and a difunctional chain extender containing active hydrogen, whose molar ratio is 2.00–1.10:1.00:1.00–0.10, and a blowing agent, said polyurethane containing approximately equal amounts of isocyanate groups and hydroxyl groups at the terminals of the polymer chains, and having a glass transition point in the range of −50° to 60° C. and a crystallinity of 3–50 wt %.

* * * * *